United States Patent
Montemarano et al.

(10) Patent No.: US 10,501,245 B2
(45) Date of Patent: Dec. 10, 2019

(54) LID FOR A DISPOSABLE BEVERAGE CONTAINER INCLUDING GRAPHIC IMAGES AND METHOD OF FABRICATING SAME

(71) Applicants: Carmine Montemarano, Woodbridge (CA); Gary Kisiloski, Markham (CA); Joe Santoianni, Aurora (CA)

(72) Inventors: Carmine Montemarano, Woodbridge (CA); Gary Kisiloski, Markham (CA); Joe Santoianni, Aurora (CA)

(73) Assignees: Carmine Montemarano, Woodbridge (CA); Gary Kisiloski, Markham (CA); Joe Santoianni, Aurora (CA); Daniel Haywood, Markham (CA)

(*) Notice: Subject to any disclaimer, the term of this patent is extended or adjusted under 35 U.S.C. 154(b) by 444 days.

(21) Appl. No.: 14/103,304

(22) Filed: Dec. 11, 2013

(65) Prior Publication Data
US 2015/0158642 A1    Jun. 11, 2015

(51) Int. Cl.
*B29C 51/10* (2006.01)
*B65D 51/24* (2006.01)
(Continued)

(52) U.S. Cl.
CPC .......... *B65D 51/245* (2013.01); *B29C 51/264* (2013.01); *B29C 51/10* (2013.01);
(Continued)

(58) Field of Classification Search
CPC ..... B29C 51/264; B29C 51/10; B29C 51/445; B29C 2793/009; B29C 2795/002
(Continued)

(56) References Cited

U.S. PATENT DOCUMENTS 3,632,252 A   1/1972  Amberg et al.
4,643,789 A * 2/1987  Parker ................ B29C 37/0025
                                                    156/219
(Continued)

FOREIGN PATENT DOCUMENTS

WO       93/20998     10/1993
WO    2012/151627     11/2012

OTHER PUBLICATIONS http://www.attn.co.nz/services/publishing/coffee-lids, 2 pages, document is undated but printed from the pertinent website on Dec. 11, 2013.
(Continued)

*Primary Examiner* — Christina A Johnson
*Assistant Examiner* — Xue H Liu
(74) *Attorney, Agent, or Firm* — Norton Rose Fulbright Canada LLP

(57) ABSTRACT

A lid for a disposable beverage container. A sheet of plastic is passed through an offset printing process to directly print images at multiple discrete locations on the sheet. During printing, registration marks are printed on the sheet. These marks are used to align the sheet correctly for subsequent printing runs in which additional colors are added to the images. The registration marks are also used to correctly position the printed sheet on a mold. Multiple lids are thermoformed into the printed plastic sheet. The registration marks are subsequently used to correctly position the thermoformed printed sheet with a die-cutter to separate the multiple printed and formed lids from the sheet. The images are printed in non-heat sensitive inks as these will resist distortion of the printed images during the thermoforming process. Preferably each image is printed so that it ends up in a depression on the eventually formed lids.

18 Claims, 10 Drawing Sheets

(51) Int. Cl.
  *B29C 51/26*  (2006.01)
  *B29K 105/00*  (2006.01)
  *B29K 23/00*  (2006.01)
  *B29L 31/56*  (2006.01)
  *B29C 51/44*  (2006.01)

(52) U.S. Cl.
  CPC ...... *B29C 51/445* (2013.01); *B29C 2793/009* (2013.01); *B29C 2795/002* (2013.01); *B29K 2023/065* (2013.01); *B29K 2105/256* (2013.01); *B29L 2031/565* (2013.01)

(58) Field of Classification Search
  USPC .......................................... 264/132, 291–292
  See application file for complete search history.

(56) References Cited

U.S. PATENT DOCUMENTS

| | | | | |
|---|---|---|---|---|
| 2003/0159601 | A1* | 8/2003 | Wynne | B05C 17/06 |
| | | | | 101/128.21 |
| 2011/0284537 | A1* | 11/2011 | Cerasani | B65D 1/34 |
| | | | | 220/212 |
| 2013/0288018 | A1* | 10/2013 | Moller | B29C 51/264 |
| | | | | 428/195.1 |

OTHER PUBLICATIONS http://www.eatmedia.com.au/coffee-cup-advertising-products/coffee-cup-lids/coffee-cup-lids.html, 1 page, document is undated but printed from the pertinent website on Dec. 11, 2013

* cited by examiner

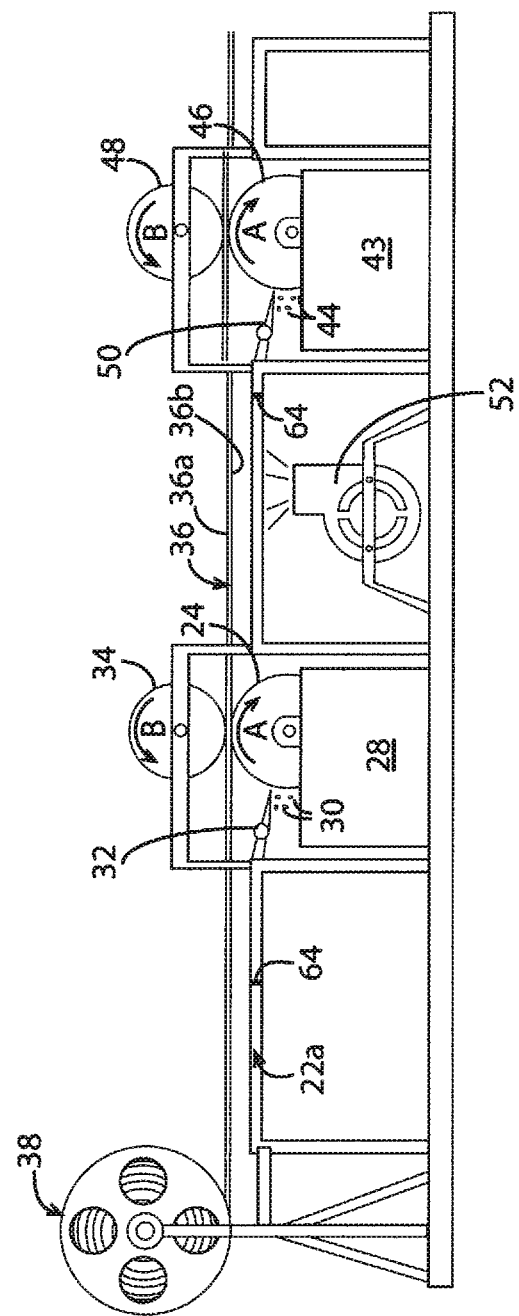

LID FOR A DISPOSABLE BEVERAGE CONTAINER INCLUDING GRAPHIC IMAGES AND METHOD OF FABRICATING SAME

BACKGROUND OF THE INVENTION

Technical Field

This invention relates generally to the production of disposable beverage containers. More particularly this invention relates to the production of lids for disposable beverage containers. Specifically, this invention relates to a lid for a disposable beverage container which includes graphic images thereon; and a method for applying the graphic images thereto which includes passing sheets of material from which the lids are made through a printing process prior to thermoforming the sheets and die-cutting the thermoformed sheets into individual lids.

Background Information

Today, advertising space is highly focused with many advertisements and special offers being displayed on gas pump handles, on shopping cart handles, on busses, trucks, billboards, and pretty much anywhere and everywhere where an advertising message can be seen by potential consumers.

One of the spaces being utilized for advertising is the upper surfaces of disposable lids, such as those used on disposable drinking cups. The lids provide for extremely focused advertising since each time the consumer takes a sip of their beverage, the advertisement on the upper surface of the lid comes into view. Presently known beverage lids are thermoformed and often have the name of the establishment and other graphic information three-dimensionally molded into the lid during the thermoforming process. The problem with this scenario is that there are no contrasting colors in these lids and so the name of the establishment and any other graphic information molded into the same fades into the background and is not immediately evident to the consumer each time they sip their beverage. The lack of contrasting color fails to draw the eye to the graphic information.

A solution has been put forth in the art by way of the application of a sticker including graphic imagery, onto the upper surface of the lid. One such company that utilizes this sticker-type approach on disposable beverage lids is ATTN! MARKETING PR of Havelock North, New Zealand. An example of their advertising is set out on their website http://www.attn.co.nz/services/publishing/coffee-lids/.
Another company utilizing this approach is EAT MEDIA of Sydney and Melbourne, Australia: http://www.eatmedia.com.au/coffee-cup-advertising-products/coffee-cup-lids/coffee-cup-lids.html. While this sticker solution does provide contrasting colors and interesting graphic images on disposable beverage container lids, it does have a problem in that an adhesive has to be applied to the sticker and the adhesive is subsequently exposed to relatively hot and moist conditions. This can lead to the stickers becoming wrinkled, thereby distorting the message thereon or the sticker may simply peel off. Additionally, the adhesive utilized must be safe for human consumption. Application of the stickers is also a bit of an issue as the lids have to be correctly positioned and oriented in machinery applying the stickers or the stickers will and up positioned incorrectly, ruining the aesthetics of the lid and distorting the advertising message.

Attempting to print advertising information on the lids after fabrication is problematic for the same reason as application of stickers after the fact. Printing of information onto the lids requires that the lids be perfectly oriented for each printing pass as it is necessary that the printing be disposed on the opposite side of the lid from the drink opening, for example. The flimsy lids would have to be correctly fitted and positioned onto a mold so that it will not bend or move while undergoing printing. Additionally, since printing of multiple colors is accomplished in several passes through a printing machine, one pass for each applied color, and because the ink must dry between each pass, printing directly onto the lids would substantially add to the cost of the same.

There is therefore a need in the art for an improved way of applying graphic images to disposable beverage container lids.

SUMMARY

A lid for a disposable beverage container. A sheet of plastic is passed through an offset printing process to directly print images at multiple discrete locations on the sheet. During printing, registration marks are printed on the sheet. These marks are used to align the sheet correctly for subsequent printing runs in which additional colors are added to the images. The registration marks are also used to correctly position the printed sheet on a mold. Multiple lids are thermoformed into the printed plastic sheet. The registration marks are subsequently used to correctly position the thermoformed printed sheet with a die-cutter to separate the multiple printed and formed lids from the sheet. The images are printed in non-heat sensitive inks (i.e., heat resistant inks) as these will resist distortion of the printed images during the thermoforming process. Preferably each image is printed so that it ends up in a depression on the eventually formed lids.

In one aspect, the invention may provide a method for applying graphic images to an outer surface of a lid for a disposable beverage container, said method including the steps of:
  passing a substantially planar sheet of material through a printing system on a first printing run;
  applying a first color ink directly to one or more discrete regions of the sheet of material during the first printing run to form at least a part of multiple graphic images in discrete locations on the sheet of material;
  passing the printed sheet of material through a thermoforming process to mold a shape of the lid into multiple locations on the sheet of material.

In another aspect, the invention may provide a step of applying a heat-resistant or non-heat sensitive first color ink directly to the sheet of material.

In yet another aspect, the invention may provide the step of directly printing, in the first printing run, one or more registration marks on the sheet of material at a position other than where at least the part of the graphic image is printed.

In a further aspect, the invention may provide the steps of passing the sheet through a thermoforming process including:
  heating the sheet of material to a point the sheet becomes pliable;
  vacuum suctioning the sheet of material to a mold; and
  molding the lid shape into the sheet of material at multiple locations.
Additionally, the method may further comprise the step of aligning the one or more registration marks with one or more markings on the mold prior to thermoforming; and further comprises the steps of passing the sheet of material through a cutting assembly to cut the multiple lid shapes from the rest of the sheet of material; which step may be preceded by aligning the one or more registration marks on the sheet with one or more markings on the cutting assembly prior to cutting the lid shapes from the sheet of material.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

FIG. 5 is a side view of a simplified offset printing system used to apply two colors to form the graphic images on the sheet of high density polyethylene;

Similar numbers refer to similar parts throughout the drawings.

DETAILED DESCRIPTION

Figure 1:
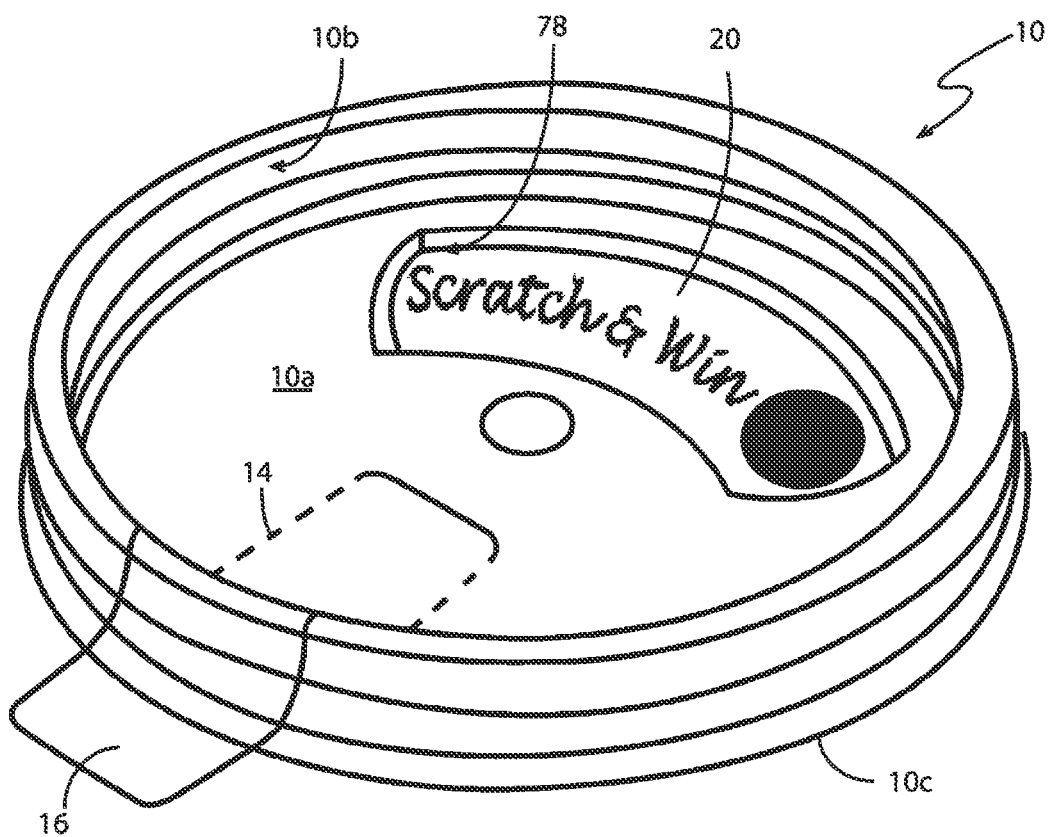
FIG. 1 is a perspective view of an exemplary lid for a disposable beverage container in accordance with an aspect of the present invention.
Figure 2:
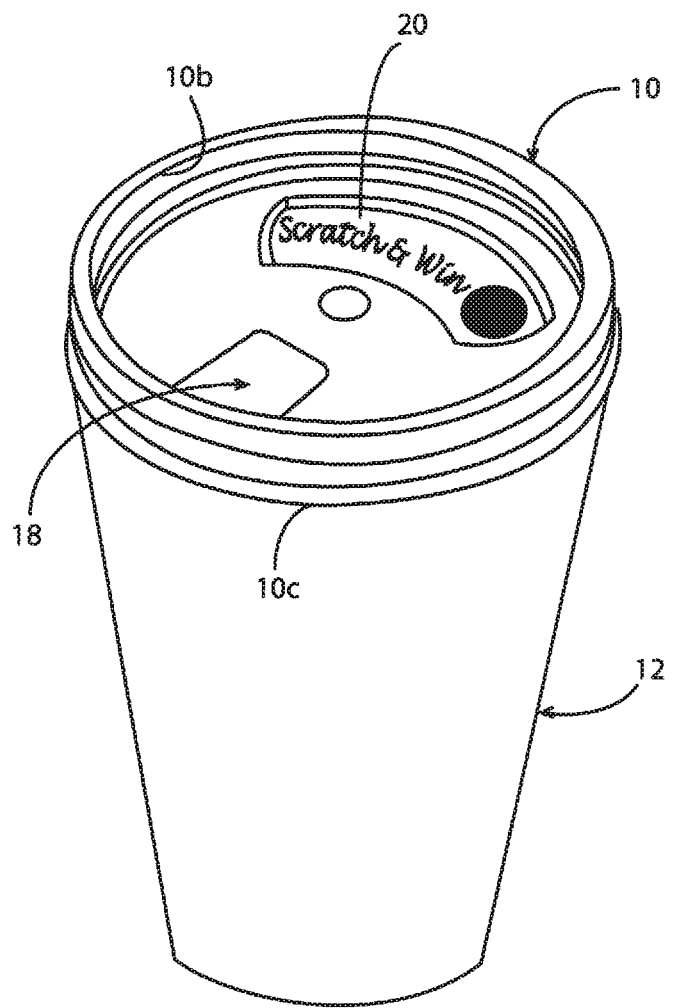
FIG. 2 is a perspective view of the disposable beverage container with the lid engaged therewith.

FIGS. 1 and 2 illustrate a beverage lid in accordance with an aspect of the present invention, generally indicated at 10. Lid 10 is configured to be applied to a disposable container, such as the disposable coffee cup illustrated in FIG. 2 and indicated generally at 12. While lid is illustrated as being circular when viewed from above, it will be understood that the lid may take any configuration desired and may be applied to any desired and differently configured but complementary container other than disposable cup 12.

Lid 10 preferably is of the type fabricated using thin-gauge thermoforming. In this type of procedure an elongate sheet of a desired type of plastic, such as high density polyethylene (HDPE) is heated to a suitable temperature to render the plastic sufficiently pliable to permit the sheet to be vacuum thermoformed over a mold. A plurality of lids is thermoformed in the sheet at the same time. Because the plastic is pliable it is formed into the shape of the mold and retains this shape upon cooling. The plastic sheet is subsequently passed through a cutting assembly, typically a die-cutting assembly, to separate the numerous individually formed lids from the rest of the plastic sheet. The fabrication process described in this paragraph is known in the art. The following description will refer to "a lid 10", in the singular but it should be understood that the process described herein will result in the simultaneous fabrication of multiple lids that are all identical. The term "lid 10" should therefore be understood to mean multiple lids.

In an aspect of the present invention, the thermoforming process described in the previous paragraph is preceded by a printing process in which a graphic image is printed at multiple specific locations on the sheet of plastic. The number of graphic images corresponds to the number of lids that will be formed out of the plastic sheet. Once the images are printed on the sheet of plastic, the sheet is sent through the thermoforming process to form the multiple lids therein. It should be understood that the plastic sheet is sent through both the printing process and the thermoforming process in a very particular orientation. This is necessary because the graphics printed on the sheet need to ultimately be positioned in specific desired locations on the eventually formed lids. In particular, the graphics printed on the sheet will preferably be located within a recess formed in each of the lids. Because of this specific end location in which the graphics will appear on the lids, it is very easy for quality control personnel to determine if the positioning of the plastic sheets in either the printing process or the thermoforming process is off. They can then take appropriate corrective action and reset the orientation and position of the sheets to ensure the correct printing and thermoforming locations are achieved.

It should be noted that in accordance with an aspect of the invention, the printing step disclosed herein is designed to be used in an already-existing process in which disposable beverage container lids are being fabricated. Thus, manufacturers of such lids will not need to have new dies and forms made in order to practice the invention disclosed herein. All that will occur is that the plastic sheet which would normally be sent through the thermoforming process to fabricate multiple lids will now first be sent through a printing step. Consequently, instead of the manufacturer sending a blank sheet of plastic into the thermoforming step, they will send a plastic sheet with multiple graphic images 20 printed on that sheet through to the thermoforming process. Furthermore, the process disclosed herein enables the manufacturer to eliminate some or all of the debossing and/or embossing that would typically have to be undertaken in particular areas of the plastic sheet and can instead simply print important information onto the sheet in appropriate locations prior to thermoforming.

As mentioned, the specific locations are determined such that the printed graphic images will be correctly aligned with certain regions of the eventually formed lids. In a further aspect of the invention, there is therefore provided a method of orienting the sheet of plastic onto which the graphic images are printed so that the graphic images are correctly positioned for application of multiple layers of color; and are correctly positioned for thermoforming the lids so that the graphic images are in desired positions on the lids; and furthermore so that the sheets are eventually able to be die-cut to produce the multiple individual lids without damaging the printed graphic images. Software may also be utilized which distorts the image prior to printing so that the image observable on the thermoformed lid 10 has a true non-distorted appearance and is therefore aesthetically pleasing.

The lid 10 illustrated in FIG. 1 includes a recessed upper surface 10a, a rim 10b which extends upwardly from an outer edge of upper surface 10a. Rim 10b terminates in a downwardly extending outside peripheral edge 10c. The rim 10b has an interior width that is suitable for frictionally engaging an upper rim region of cup 10. Lid 10 further includes an interior surface (not shown) which will be disposed proximate a beverage retained within cup 12. Lines of weakness 14 are formed in upper surface 10 and some type of pull-tab 16 is provided adjacent the lines of weakness. If pull tab 16 is removed, a drink-opening 18 (FIG. 2) is formed in lid 10. Alternatively, a drink-opening or an opening for receiving a straw may be preformed in lid 10 without providing lines of weakness and/or a pull tab. Still further, some type of push tab (not shown) may be provided which covers drink-opening 18 prior to removal or detachment thereof by the consumer. It will be understood that any configuration of these types of elements may be provided on lid 10 as they are not pertinent to the invention disclosed herein. Suffice to say that lid 10 may therefore be provided in any desired configuration and may be fabricated out of any suitable material that enables it to be formed into the desired shape with any combination or configuration of openings and holes therein.

In accordance with an aspect of the present invention, advertising or informational graphic images are provided on upper surface 10a of lid 10. These graphic images (referenced in the figures by the character 20) may take any form and may constitute logos, text, pictures or the like. It should be understood that any an all combinations of such text, figures, photos, or other advertising or informational messaging that is desired to be placed on lid 10 is referenced in this description by the term "graphic images".

In accordance with another aspect of the invention, graphic images 20 are directly printed onto a surface of a sheet of plastic and this direct printing occurs prior to a thermoforming process in which the shape of multiple lids are fabricated in the sheet.

Graphic images 20 are printed onto the sheet such that when the lid is thermoformed, the graphic images will be positioned in specific locations of the lid, most particularly a recessed region. Alternatively, the printing may occur on the sheet such that in the eventually formed lids the graphic images 20 will be situated on flat regions of the lid, or on raised regions of the lid, or any combination of the same. Furthermore, graphic images 20 that were originally directly printed on the sheet may cover substantially the entire upper surface 10a of the eventually thermoformed lid 10. The graphic images 20 may even extend over the rim 10b and to peripheral edge 10c, although preferably, graphic images 20 are provided in an area of upper surface 10a that is spaced a distance inwardly from peripheral edge 10c. The reason for this will be indicated later herein.

It should be noted that in accordance with an aspect of the present invention, as will be described further herein, the graphic images 20 themselves are comprised of one or more layers of ink of one or more colors that preferably is different from the color of the plastic used to form lid 10.

The ink utilized for these purposes preferably is not heat sensitive. In other words, the inks preferably are heat resistant meaning that they will not tend to react, deteriorate or melt when exposed to heat when the medium to which they are applied, namely the plastic used to form lid 10, is molded during the thermoforming process. Thus, inks that are not heat sensitive and/or heat resistant are preferred for the printing step of the process.

Possible types of ink that may be suitable for printing on a sheet that is subsequently to be thermoformed include but are not limited to nitro-cellulose solvent inks that are typically used in Flexographic or Gravure type printing; ultraviolet curable inks, or inks typically used in conventional offset printing, such as oil-based inks. It is likely that water-based inks will be unsuitable for the printing process due to the rewetting factor involved with the use of the ink on lids for beverage containers. Water-based inks may also not adhere properly to the plastic used to form the lids. It may also be desirable to mask the color print with an opaque white to allow either spot colors or CMYK (Cyan-Magenta-Yellow-Black) to be as close as possible to their recognized hue if the substrate is a different color other than white itself. If the stocks Dyne levels are low it may also be necessary to prime the stock initially, preprinting colors to ensure adhesion. Because of the end-use of the lids, i.e., because they will be used in conjunction with a liquid that is to be consumed, the inks involved will have to be approved for use by the FDA, Health Canada or any other standard-setting body in a country where this process will be practiced or the lids will be used.

Furthermore, other than the thickness of the ink, the graphic images 20 themselves preferably are not raised or lowered with respect to the rest of lid 10. Graphic images 20 may however, be printed on the sheet so that the images 20 will ultimately be situated over regions of lid 10 which are thermo-formed into various contours and profiles.

As indicated previously, graphic images 20 are directly printed onto the sheet of material from which lids 10 are fabricated. In particular, graphic images 20 are directly printed onto this material prior to the formation of lids 10 themselves. Most particularly, graphic images 20 are offset printed onto the material used to fabricate lids 10 prior to that material being thermoformed. It will be understood that instead of offset printing being used to print graphic images 20 directly onto the plastic material, the graphic images 20 may alternatively be printed using other printing processes including but not limited to digital printing.

Figure 3:
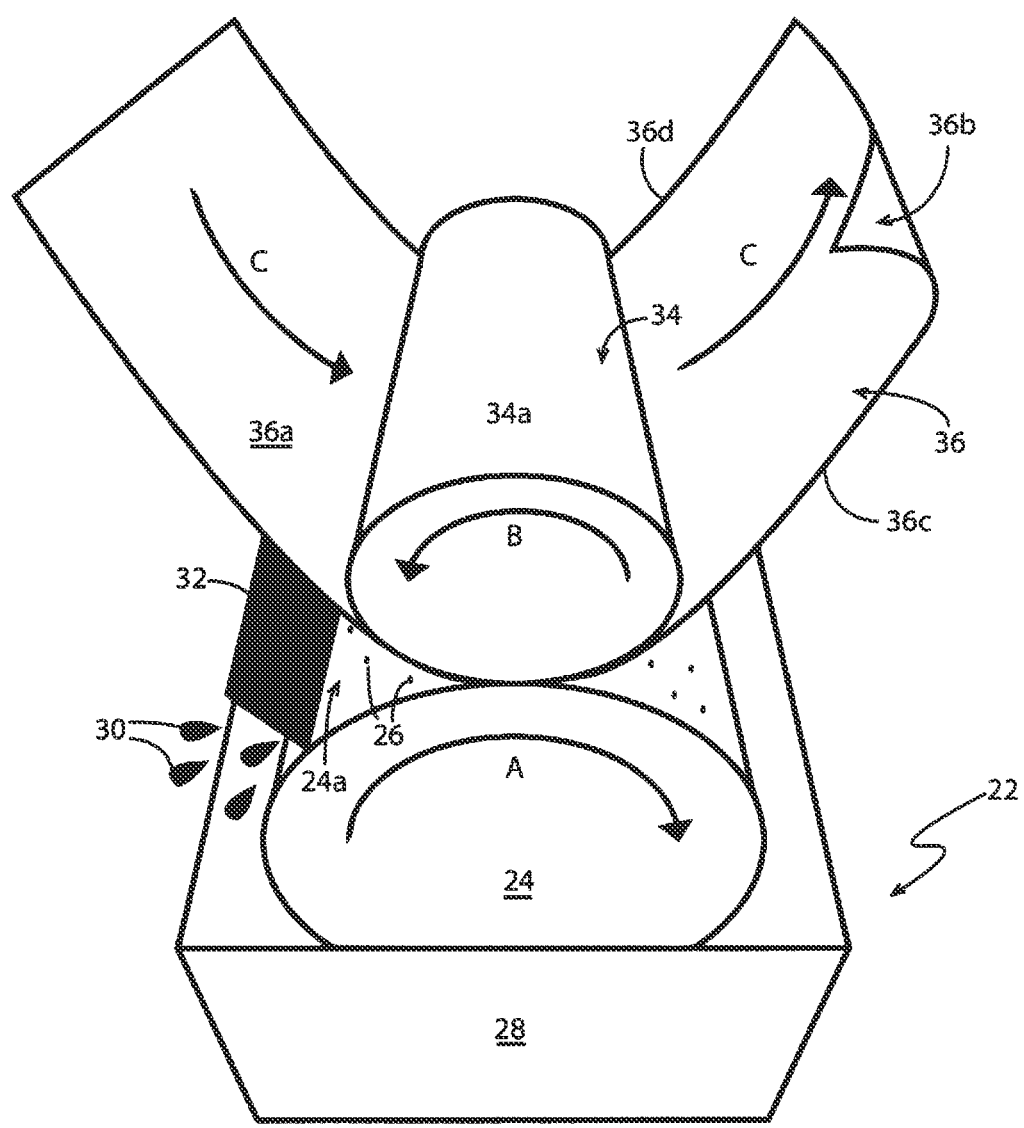
FIG. 3 is a simplified offset printer used in a graphic images printing process which forms part of the fabrication of the lid.

Referring to FIGS. 3-9, there is shown and described a manufacturing process for lid 10 which includes an offset printing method for applying graphic images 20 thereto. FIG. 3 shows a simplified perspective view of an offset printing system, generally indicated at 22. Printing system 22 is configured so as to be able to print one color of ink at a time. Printing system 22 includes a gravure cylinder 24 having an exterior circumferential surface 24a into which is etched a plurality of spaced-apart depressions 26. These depressions 26 are negatives of some or all of the graphic images 20 which it is desired to print onto the lid 10. Cylinder 24 is mounted for rotation upon shafts (not shown) and a portion of cylinder 24 passes through an ink fountain 28 within which is provided a quantity of ink 30 of a first color. Cylinder 24 is set up to be rotated continuously in a first direction, as is indicated by arrow "A" (FIG. 3), and pass through an upper region of ink fountain 28. As it does so, cylinder 24 picks up a quantity of ink in each etched depression 26. A doctor blade 32 is mounted to engage part of the exterior surface 24a of cylinder 24 as the cylinder 24 is rotated out of ink fountain 28. The doctor blade 32 scrapes excess ink 30 off exterior surface 24a of cylinder 24, as is illustrated in FIG. 3.

An impression roller 34 is rotatably mounted on shafts (not shown) so as to be spaced a small distance away from exterior surface 24a of cylinder 24. Thus, a gap (not numbered) is defined between the exterior surface 24a of cylinder 24 and the circumferential exterior surface 34a of roller 34. Impression roller 34 is configured to rotate in a direction opposite to the rotation of cylinder 24. This opposite direction of rotation is illustrated in FIG. 3 by the reference character "B".

A sheet of material, indicated by reference character 36 is fed into the gap (not numbered) between cylinder 24 and roller 34. Sheet 36 is fed into this gap in the direction indicated by arrow "C" and as cylinder 24 and roller 34 rotate in opposite directions, sheet 36 is continuously fed through the gap by the cylinder 24 and roller 34 in the direction of arrow "C". Roller 34 applies pressure to sheet 36 so that ink 30, located in depressions 26 on cylinder 24, is transferred onto sheet 36. Preferably, for the fabrication and printing of beverage lids 10 in accordance with an aspect of the present invention, sheet 36 comprises a thin, elongate and planar sheet of high density polyethylene (HDPE) which is fed off a roll 38 (FIG. 5) and into offset printer 22.

It will be understood that the sheet 36 may, alternatively comprise a plurality of shorter lengths of HDPE material, for example, a sheet that is of a width and length that could be easily fed into a smaller portable offset printer rather than an offset printer that forms part of a fabrication line. These shorter length sheets could be individually fed into the gap between cylinder 24 and roller 34 either by a person or by machinery. The shorter length would enable persons manning smaller offset printers system 22 to more easily handle sheet 36.

Referring still to FIG. 3, sheet 36 has a first surface 36a and a second surface 36b. First surface 36a is destined to become the interior surface of lid 10 and second surface 36b is destined to become the exterior surface of lid. Second surface 36b contacts exterior surface 24a of cylinder 24 and, consequently, ink 30 retained in depressions 26 on exterior surface 24a is transferred onto second surface 36b.

Figure 4:
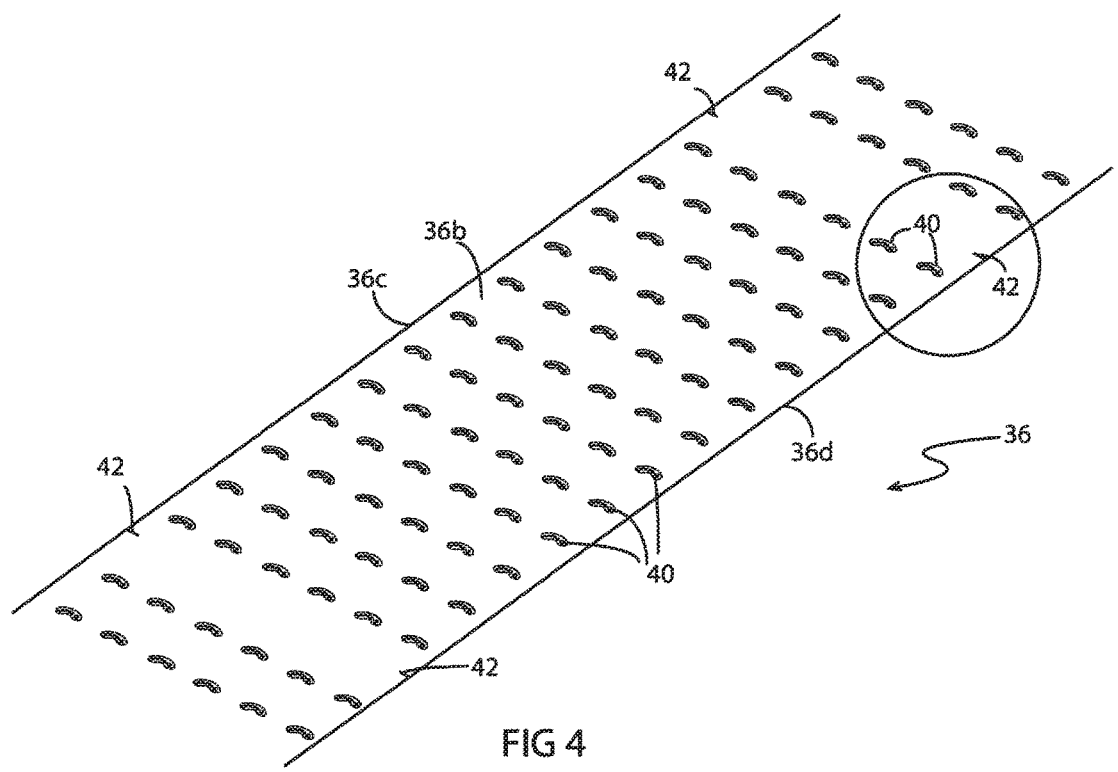
FIG. 4 is a top perspective view of a sheet of high density polyethylene upon which graphic images of a first color have been printed by the offset printer of FIG. 3.

In accordance with an aspect of the invention, a method of directly printing graphic images 20 onto lid 10 includes passing planar sheet 36 of material through offset printing system 22 on a first printing run (FIGS. 3 and 4). In this first printing run a plurality of images 40 are printed on second surface 36b of sheet 36. Images 40 are directly printed onto second surface 36b in a first color of ink 30. Images 40 may constitute the entire graphic image 20 that appears on lid 10 or may be only part of that graphic image 20. Images 40 are printed in a spaced-apart pattern in discrete and specific regions of second surface 36b which correspond to the spacing and pattern of depressions 26 formed in exterior surface 24a of cylinder 24. It should be noted that roller 34 applies pressure to sheet 36 to ensure good contact is made between exterior surface 24a and second surface 36b so that ink is fully transferred from depressions 26 and onto second surface 36b. The pressure applied to sheet 36 by roller 34 also ensures that sheet 36 is fed through the gap in the direction of arrow "C".

Figure 4A:
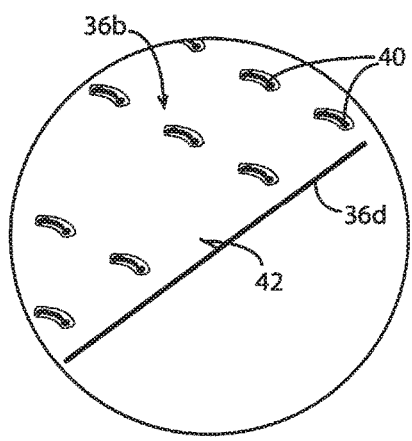
FIG. 4a is an enlarged view of the highlighted region of FIG. 4.
Figure 5A:
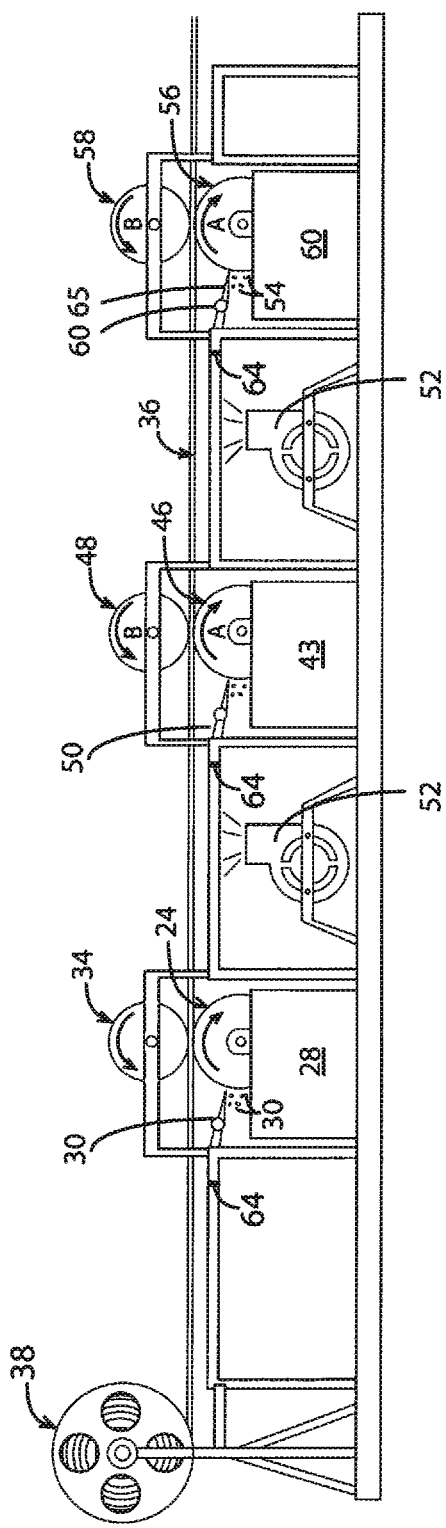
FIG. 5a is a side view of a simplified offset printing system used to apply three colors to form the graphic images on the sheet of high density polyethylene.

In accordance with an aspect of the invention, a plurality of registration marks 42 (FIGS. 4 and 4a) are also printed onto second surface 36b in this first printing run. Registration marks 42 preferably are formed in aligned pairs adjacent opposite side edges 36c, 36d of sheet 36. Aligned pairs of registration marks 42 are spaced at intervals from each other along length of sheet 36.

If substantially the entire desired graphic image 20 is printed in the first color of ink 30 in the first pass through offset printer 22, then the direct printing of sheet 36 is completed and sheet 36 is moved to the next stage of the process of forming the lid 10. It will be understood that the ink 30 of the first color must dry on sheet 36 prior to further processing of the same.

If the desired graphic images 20 include a second color of ink, then sheet 36 must be processed by being printed at least a second time to add the second color to images 40. This may be done by feeding sheet 36 down a fabrication line which includes ink fountain 28, cylinder 24 and roller 34, and a second ink fountain 43, a second gravure cylinder 46, and a second impression roller. FIG. 5 shows a simplified support system 22a or conveyor or other system which will support sheet 36 as it is moved from roll 38 toward ink fountain 28 and then on to ink fountain 43. Alternatively, sheet 36 may be stretched between rotating support brackets that aid in feeding sheet 36 down the fabrication line. Second ink fountain 43 contains a second color ink 44. Although not illustrated in this figure, it will be understood that second cylinder 46 has etched depressions formed in its exterior surface. These etched depressions are configured to form a second portion of the graphic images 20 in the second color ink 44. In other words, the portions of the image etched into second cylinder 46 hold ink 44, which ink 44 gets added to the images 40 printed on sheet 36 after the first printing run. A second doctor blade 50 scrapes excess ink 44 off second cylinder 46 before it encounters sheet 36. After exiting the gap between cylinder 24 and roller 34, ink 44 on sheet 36 must dry and so a second blower 52 may be provided to blow air onto second surface 36b of sheet 36.

If a third ink color 54 is to be applied to second surface 36b to complete graphic image 20, then sheet 36 will be fed into a gap defined between a third cylinder 56 and a third roller 58 (FIG. 5a) which are positioned over a third ink fountain 60 holding a quantity of a third ink color 54. Once again the exterior surface of third cylinder 56 includes etched depressions which are configured to form a third portion of the graphic images 20 on second surface 36b. A doctor blade 62 is positioned to engage the exterior surface of third cylinder 56 and as sheet 36 is fed through the gap between third cylinder 56 and third roller 58, an additional portion of each graphic image 20 is printed onto second surface 36b in the third ink color 54.

Figure 6:
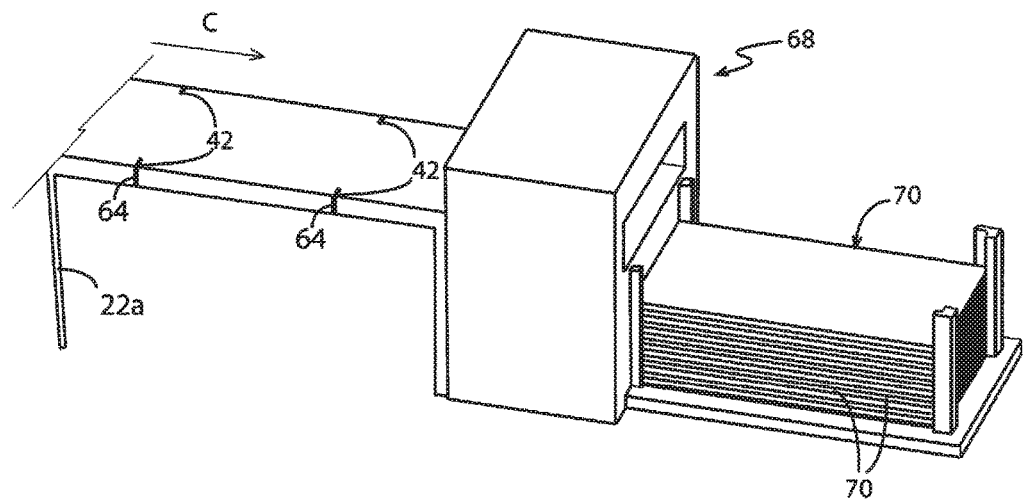
FIG. 6 is a top perspective view of a simplified cutting assembly used to cut the elongate sheet into sheet sections used.

One of the issues when printing more than one color ink on second surface 36b is ensuring that the ink is applied in exactly the correct location relative to the printing of the first color images 40 (FIG. 4). The purpose of registration marks 42 that are printed in the first printing run (i.e., when sheet 36 moves through the gap between cylinder 24 and roller 34) is to ensure that the sheet is accurately positioned for the second printing run (i.e. when sheet 36 moves through the gap between second cylinder 46 and second roller 48). Registration marks 42 preferably are therefore aligned with complementary markings 64 provided on relevant sections of offset printing system 22, such as parts of support platform 22a (FIG. 6). The operator ensures that these registration marks 42 align with markings 64 on support platform 22a prior to sheet entering second ink fountain 43, third ink fountain 60 and, as will be described hereafter, a cutting assembly 68 (FIG. 6). The alignment of registration marks 42 being aligned with markings 64 ensures that the printing of the second and subsequent colors of ink and the cutting of the sheet 36 for further processing will occur at the correct locations so that the desired graphic image 20 is printed in the optimum locations on sheet 36. If the alignment between marks 42 and markings 64 is off then the graphic images 20 will be ruined and/or the graphic images 20 may fall in the incorrect regions of lid 10 during thermoforming.

Figure 6A:
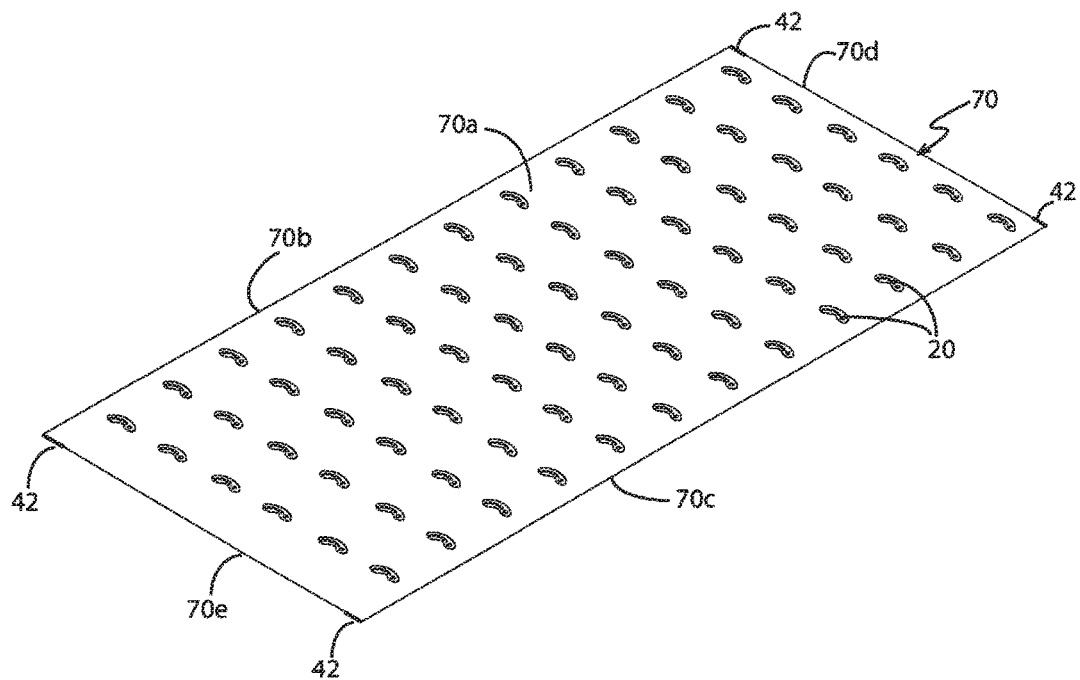
FIG. 6a is a bottom perspective view of a sheet section that has been cut from the elongate sheet and showing the completed graphic images thereon.

FIG. 6 shows sheet 36 being fed into cutting assembly 68, which then cuts sheet 36 into sheet sections 70 which are stacked one on top of the other adjacent cutting assembly 68. A single sheet section 70 is illustrated in FIG. 6a. Sheet section 70 includes has a first surface 70a, a second surface (not shown), a first side edge 70b, a second side edge 70c, a first end 70d, and a second end 70e. Several rows of spaced apart graphic images 20 have been printed on first surface 70a through the one or more printing passes. (It will be understood that sheet 36 may be passed through more than three printing passes if that is necessary or desirable). First surface 70a of sheet was formerly part of lower surface 36b of sheet 36. Graphic images 20 comprise one, two, three, four or more colors of ink 30, 44, 54, depending on how many printing runs sheet 36 was put through. The graphic images 20 may therefore comprise one to four colors plus more color plates for special varnishes, scratch and win processes, white bases for darker substrates and richer colors.

It should also be noted that parts of registration marks 42 are visible adjacent first and second edges 70d, 70e of sheet section 70.

Figure 7:
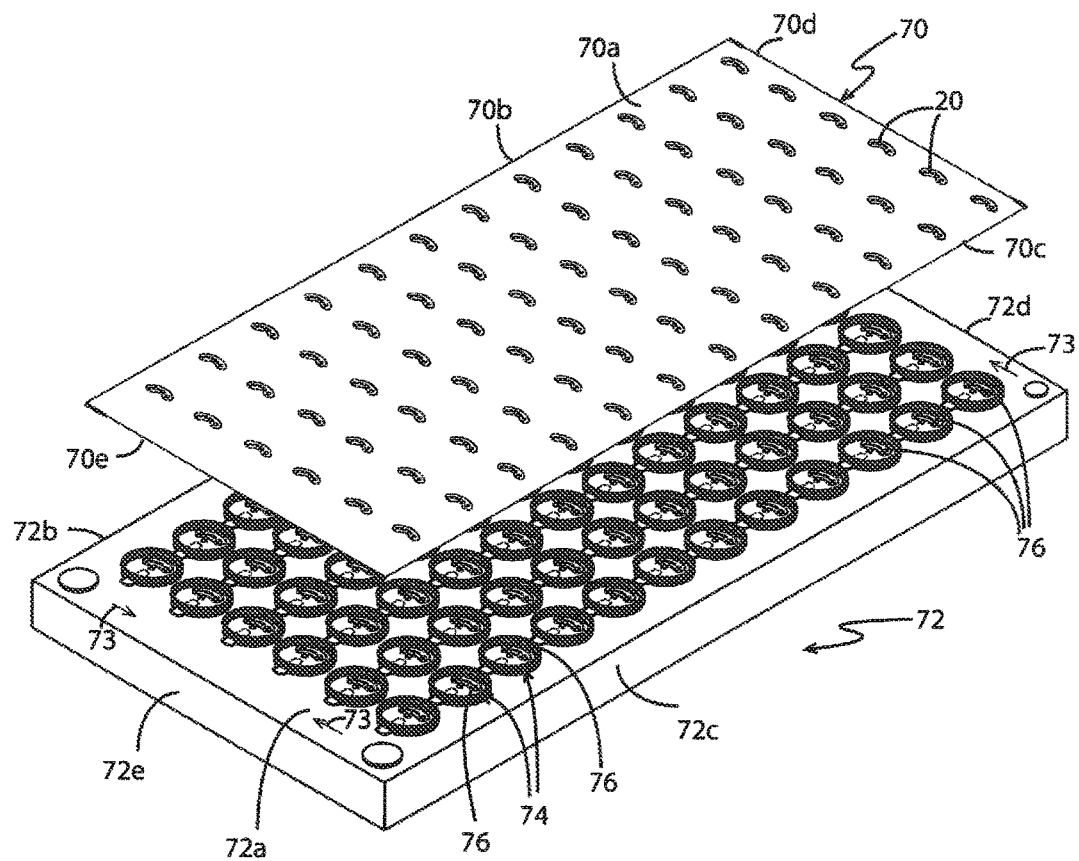
FIG. 7 is a perspective view of the sheet section being moved into a position over a mold.

Referring to FIG. 7, sheet section 70 is brought into the proximity of a mold 72. It should be understood that a single style of lid 10 could be produced at one time by utilizing a single mold on a single run through the process. Alternatively, if desired, a plurality of different style lids can be produced in a single run by utilizing several different molds.

It will be understood that immediately prior to the molding step or immediately after the sheet 70 is positioned adjacent mold 72, the plastic sheet 70 is heated. This heating may occur by passing the sheet 70 alone or the sheet 70 and the mold 72 through an oven which is part of a fabrication line. Mold 72 includes a first surface 72a, a second surface (not shown), a first side edge 72b, a second side edge 72c, a first end 72d, and a second end 72e. Sheet section 70 is substantially the same width and length as mold 72 and is configured to be placed in an exact position relative to mold 72; such that the second surface of sheet section 70 is in abutting contact with first surface 72a of mold 72. Mold 72 includes a plurality of rows of spaced-apart cup-lid molding regions indicated generally at 74. Registration marks 42 on sheet 70 are aligned with indicators 73 on mold 72 to ensure that graphic images 20 on sheet 70 will be correctly positioned so as to align with specific areas 76 of molding regions 74 when sheet 70 is disposed adjacent mold 72.

Figure 8:
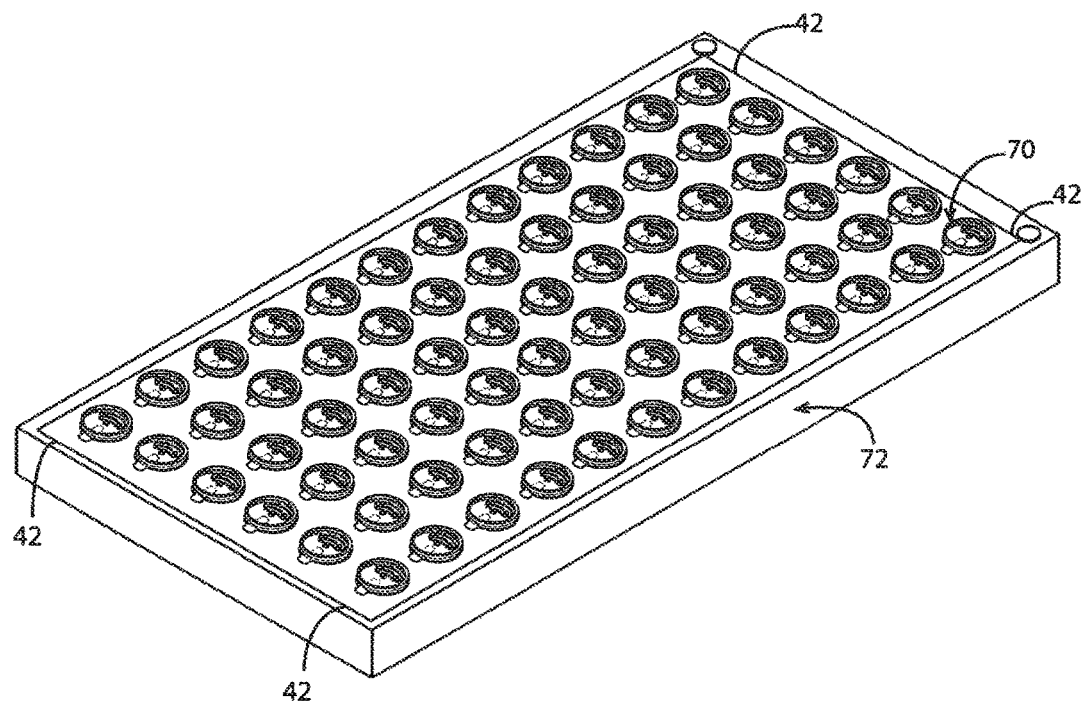
FIG. 8 is a perspective view of the sheet section being vacuum thermo-formed by the mold.
Figure 8A:
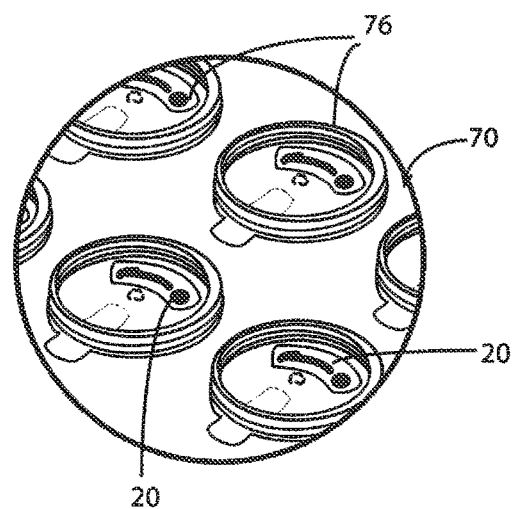
FIG. 8a is an enlarged perspective view of the a portion of the sheet section showing the lid precursors formed in the sheet section.
Figure 9:
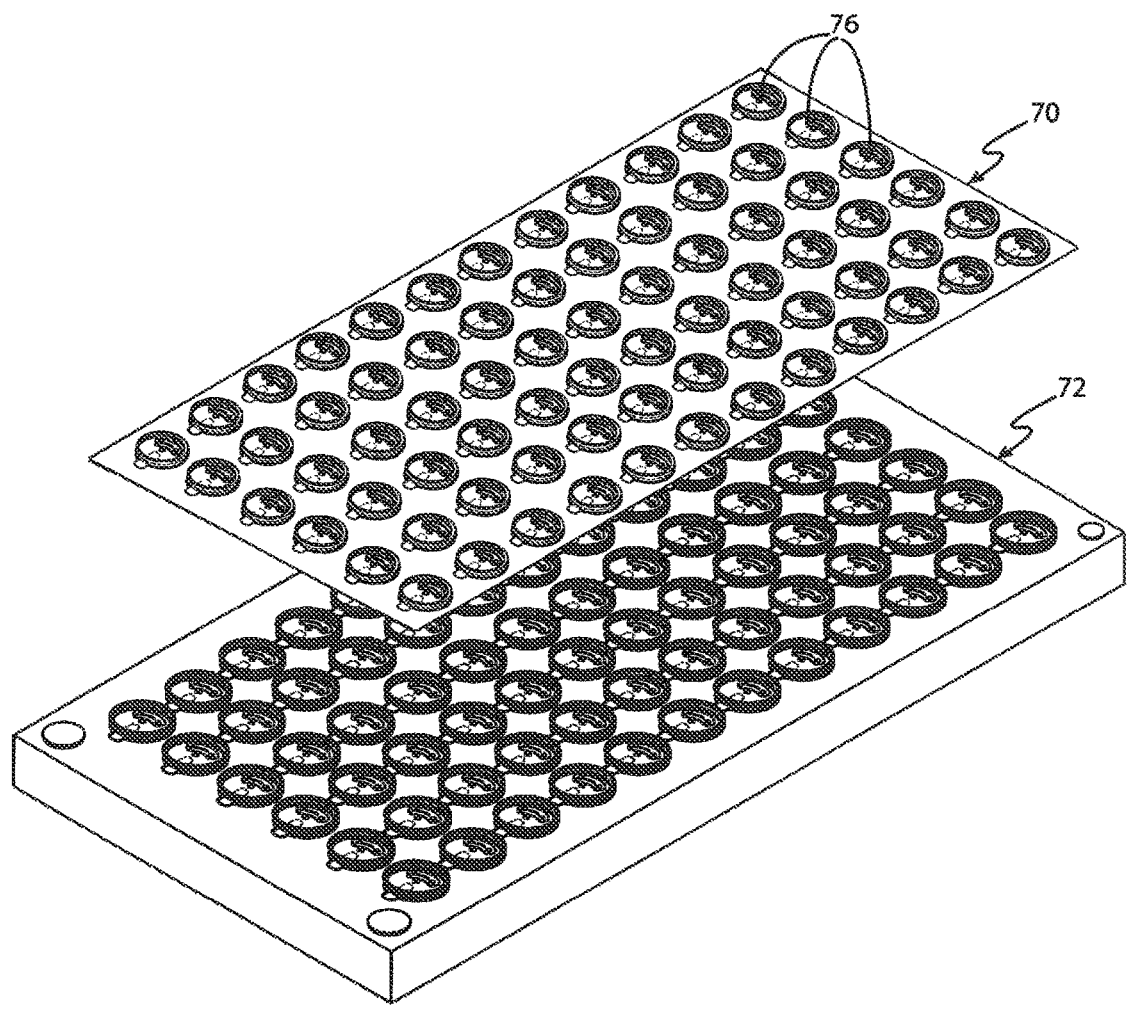
FIG. 9 is a perspective view of the thermoformed sheet section being disengaged from the mold.

When sheet 70 abuts first surface 72a of mold 72 (FIG. 8), vacuum suction is applied thereto. Because the sheet 70 is heated and therefore pliable, the shapes of the mold regions 74 on mold 72 are thermoformed into sheet 70. Thus, a plurality of lid-shaped regions 76 are formed in sheet 70 (FIG. 8a). The sheet is subsequently cooled and the vacuum is deactivated. FIG. 9 shows the sheet 70, with a plurality of molded lid-shaped regions 76 formed therein, being lifted off mold 72.

It should be noted that in the example illustrated herein each of the graphic images 20 falls within a depression (not shown in FIG. 8a but shown in FIG. 1 as depression 78) formed within each lid-shaped regions 76. The location of graphic image 20 in depression 78 is desirable as it is immediately obvious to quality control personnel if the sheet of plastic being printed and subsequently thermoformed is in the correct location—as the image 20 will fall within the bounds of the depression. If the position or orientation of the sheet is off in either of the printing or thermoforming steps, at least part of the image 20 will be located outside of depression 78 when lid 10 is thermoformed. Thus, depression 78 provides a quick and easy way to check for the correct positioning of sheet 36 in the printing and thermoforming steps.

Sheet 70 with molded lid-shaped regions 76 therein is passed through a cutting assembly to cut the lid-shaped regions 76 free from the rest of sheet 70 to form a plurality of individual lids 10. Preferably, the cutting assembly is a die-cutter.

It will be understood that in a high-speed thermoforming operation, the steps of heating the sheet, engaging the sheet with the mold, application of vacuum to form the lid-shapes in the sheet, cooling the sheet and die-cutting the same may occur in rapid succession and in more or less the same location in the process.

Each individual lid 10 (shown in detail in FIG. 1) includes the graphic image 20 printed on the upper surface 10a of the lid 10. Most particularly, graphic image 20 is printed within a depression 78 that has been molded into lid 10 and is graphic image 20 is thus recessed with respect to the rest of upper surface 10a. The graphic images 20 is spaced from the peripheral edge 10c and therefore is not distorted or stretched in the process of molding lid region 76 in sheet 70, and thus the image 20 printed on lid 10 is of an excellent quality.

It will be understood that the configuration of lid 10, depression 78, graphic images 20 and pull tab 16 are by way of example only and the invention should not be construed to be limited to the exact configuration illustrated and described herein.

It should be noted that because the ink used in this process is not sensitive to heat, the graphic image 20 printed on lid 10 is not distorted or damaged when the lid itself is thermoformed. The graphic images 20 printed onto sheet 36 remain in substantially the same condition from when they are initially printed onto sheet 36 through sheet 36 being molded to form lids 10, and through to when the consumer has finished drinking their beverage and is disposing of lid 10. Additionally, because the process described herein enables the manufacturer to position graphic images 20 inwardly away from the regions of the sheet 36 that will eventually become the rim 10b and peripheral edge 10c of lid 10, the graphic images 20 are not distorted when sheet 36 is stretched and pulled onto mold 76 as the sheet undergoes thermoforming.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A method for applying graphic images to an outer surface of a plurality of lids for a plurality of disposable beverage containers, said method including the steps of:
   passing a substantially planar sheet of material through a printing system on a first printing run;
   directly printing, in the first printing run, a plurality of registration marks on the sheet of material, the plurality of registration marks including at least two or more aligned pairs adjacent opposite side edges of the sheet of material, the aligned pairs spaced at intervals from each other along a length of the sheet of material and substantially aligned with complementary markings of the printing system;

applying, during the first printing run, a first color ink directly to one or more discrete regions of the sheet of material to form at least a part of a graphic image in the one or more discrete regions of the sheet of material, wherein the at least part of the graphic image is distinct and separate from the one or more registration marks;

correctly positioning the printed sheet of material in a thermoforming machine using the plurality of registration marks in alignment with corresponding indicators on the thermoforming machine;

passing the sheet of material through a thermoforming process in the thermoforming machine;

molding into the sheet of material, during the thermoforming process, a plurality of lids that are circular in shape when viewed from above; and wherein when thermoformed, each of the one or more graphic images is disposed on an outer surface of one of the one or more circular lids;

correctly positioning the thermoformed sheet of material in a cutting assembly using the plurality of registration marks;

cutting to the circular lids from the sheet of material in a cutting process performed by the cutting assembly; and removing the circular lids with the graphic images printed thereon from the cutting assembly.

2. The method as defined in claim 1, wherein the step of applying a first color ink directly to the sheet of material comprises applying a heat-resistant first color ink to the sheet of material.

3. The method as defined in claim 1, wherein the step of passing the sheet through the thermoforming process includes:

heating the sheet of material to a point the sheet becomes pliable;

vacuum suctioning the sheet of material to a mold; and molding the circular lid shape in multiple locations in the sheet of material; and wherein the multiple locations of the circular lid shape correspond to the positioning of the graphic images printed on the sheet prior to thermoforming.

4. The method as defined in claim 3, further comprising the step of:

aligning the one or more registration marks with one or more markings on the mold prior to thermoforming.

5. The method as defined in claim 1, further comprising the step of: aligning the one or more registration marks on the sheet with one or more markings on the cutting assembly prior to cutting the lid shapes from the sheet of material.

6. The method as defined in claim 2, further comprising the steps of: applying a second color of ink to one or more areas of the material during a second printing run, which second printing run occurs between applying the first color of ink and thermoforming the sheet of material; and utilizing the one or more registration marks and the complementary markings of the printing system to correctly position the sheet of material during application of the second color ink to the one or more areas of the sheet material during the second printing run.

7. The method as defined in claim 6, further comprising the step of: applying an additional color of ink to one or more areas of the material during an additional printing run, which additional printing run occurs between applying the second color of ink and thermoforming the sheet of material.

8. The method as defined in claim 7, wherein the steps of applying the second color and the additional color; includes applying one or both of the second and the additional color in discrete regions of the planar sheet which are different from the regions in which the first color was applied; or applying one or both of the second and the additional color in discrete regions on the planar sheet which partially or fully overlap the discrete regions in which the first color was applied.

9. The method as defined in claim 1, further comprising the steps of: wherein the step of passing a substantially planar sheet of material through a printing system on a first printing run comprises printing at least a first color onto the planar sheet of material utilizing an offset printer.

10. The method as defined in claim 7, wherein the steps of applying the second color and the additional color include applying a non-heat sensitive ink of the second color and applying a non-heat sensitive ink of the additional color to a surface of the material.

11. The method as defined in claim 10, wherein the application of the first color, the second color, and the additional color occurs in the discrete regions which will be located inwardly from a peripheral edge of the lids eventually shaped by vacuum suctioning the forming piece onto the mold.

12. The method as defined in claim 11, further comprising the step of drying the first ink before application of the second ink; and drying the second ink before application of the additional ink.

13. The method as defined in claim 1, further comprising the step of: packaging the printed and thermoformed individual lid shapes for shipment.

14. The method as defined in claim 1, further comprising the steps of utilizing distortion software to distort the graphic image prior to applying the first color ink directly to the one or more discrete regions of the sheet of material; and printing the distorted graphic image on the sheet of material.

15. The method as defined in claim 14, further comprising the steps of correcting the distortion of the graphic image printed on the sheet of material through the steps of passing of the sheet of material through the thermoforming process; and forming a non-distorted image on each the molded one or more lids.

16. The method as defined in claim 1, further comprising the step of creating a depression in the lid during the thermoforming process; and forming the graphic image substantially entirely with the depression in the lid.

17. The method as defined in claim 1, further comprising a step of cutting lengths of the sheet material from a roll of sheet material between the steps of printing the sheet material and thermoforming the printed sheet material.

18. The method as defined in claim 17, wherein prior to thermoforming the method further comprises:

placing each cut length of sheet material onto a mold;

aligning the cut length of sheet material with indicators on the mold; and aligning the one or more registration marks with the one or more indicators on the mold.

* * * * *